United States Patent [19]

Bixler

[11] Patent Number: 4,893,426

[45] Date of Patent: Jan. 16, 1990

[54] LUGGED COUPLING APPARATUS

[75] Inventor: Timothy D. Bixler, Katy, Tex.

[73] Assignee: South Central Research Corp., Katy, Tex.

[21] Appl. No.: 255,597

[22] Filed: Oct. 7, 1988

[51] Int. Cl.[4] .......................... F41C 21/18; F41C 27/00
[52] U.S. Cl. .................................. 42/75.01; 89/14.05; 403/299; 403/348; 403/342
[58] Field of Search ...................... 42/75.01, 79, 75.02, 42/75.03; 403/299, 348, 342; 89/14.05, 14.1, 14.2, 14.3, 14.4, 14.5, 14.6

[56] References Cited

U.S. PATENT DOCUMENTS

| | | | |
|---|---|---|---|
| 968,583 | 8/1910 | Michaud | 42/79 |
| 1,167,943 | 1/1916 | Short | 403/348 |
| 2,466,400 | 5/1949 | Ennis | 42/79 |
| 3,736,011 | 5/1973 | Ward | 403/342 |
| 4,653,210 | 3/1987 | Poff, Jr. | 42/16 |

FOREIGN PATENT DOCUMENTS 831474   3/1960   United Kingdom .............. 42/75.02

Primary Examiner—Deborah L. Kyle
Assistant Examiner—Michael J. Carone
Attorney, Agent, or Firm—Kenneth A. Roddy

[57] ABSTRACT

An internally threaded collar having internal lugs is slidably received on a shaft having corresponding external lugs and is threadedly engaged on a threaded member and when rotated will engage the lugs and draw the shaft and threaded member together to form a secure, accurately aligned mechanical coupling which may be disassembled by reversing the process. The collar need never be completely removed from the threaded member to install or remove the shaft.

10 Claims, 3 Drawing Sheets

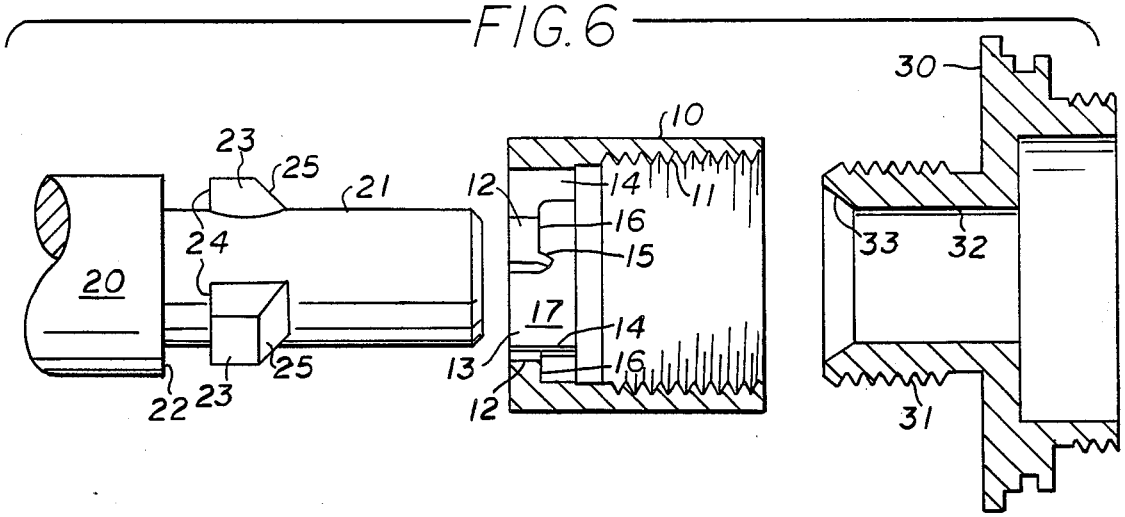
FIG. 6
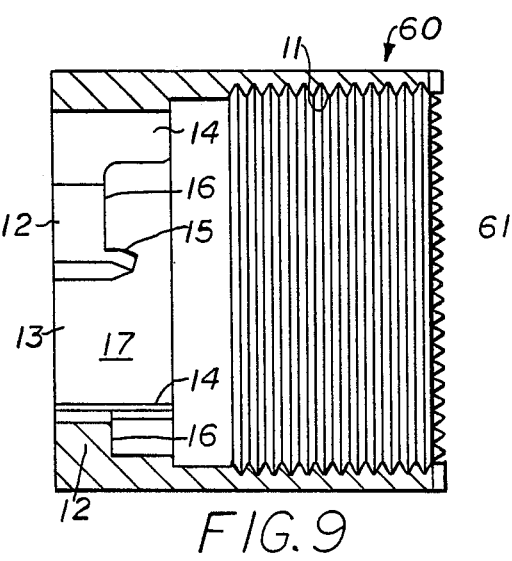
FIG. 7
FIG. 8
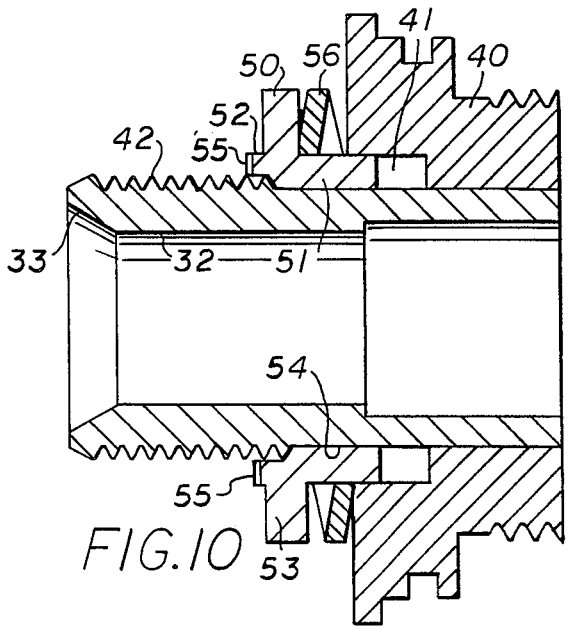
FIG. 9
FIG. 10

LUGGED COUPLING APPARATUS

BACKGROUND OF THE INVENTION

2. Field of the Invention

This invention relates generally to coupling devices, and more particularly to an internally threaded collar having internal lugs and pockets which engage corresponding external lugs on a shaft to secure the shaft to a threaded member.

2. Summary of the Invention

It is therefore an object of the present invention to provide a coupling apparatus which is particularly suited for use on firearm barrels to quickly and easily attach flash hiders, silencers, grenade launchers, blank adapters and the like.

It is another object of this invention to provide a coupling apparatus which utilizes mating lugs to attach shaft devices to threaded devices.

Another object of this invention is to provide a coupling apparatus which utilizes mating lugs and sliding fits between male and female devices to obtain accurate and positive alignment.

Another object of this invention is to provide a coupling apparatus which utilizes mating lugs and sliding fits between threaded male and female devices which avoids direct threading of the male device to allow the use of 0-rings for sealing and alignment purposes.

Another object of this invention is to provide a coupling apparatus which utilizes a lugged collar threadedly engaged on a threaded member to secure a lugged shaft and whereby the collar need never be completely removed to remove the shaft thus preventing damage to the parts through mishandling or abuse.

Another object of this invention is to provide a coupling system which utilizes mating lugs and sliding fits between male and female devices to obtain accurate indexed alignment of the mating parts.

A further object of this invention is to provide a coupling apparatus which utilizes mating lugs, sliding fits, and a spring biased locking arrangement to prevent relative rotation between mating parts.

A still further object of this invention is to provide a coupling apparatus which is simple in construction, economical to manufacture and rugged and reliable in use.

Other objects of the invention will become apparent from time to time throughout the specification and claims as hereinafter related.

The above noted objects and other objects of the invention are accomplished by an internally threaded collar having internal lugs which is slidably received on a shaft having corresponding external lugs and is threadedly engaged on a threaded member and when rotated will engage the lugs and draw the shaft and threaded member together to form a secure, accurately aligned mechanical coupling which may be disassembled by reversing the process. The collar need never be completely removed from the threaded member to install or remove the shaft.

BRIEF DESCRIPTION OF THE DRAWINGS

FIG. 6 is a side elevation view in cross section of the members prior to assembly.

FIG. 7 is an end view of a locking ring member for a modified coupling apparatus.

FIG. 8 is a side elevation of the locking ring member.

FIG. 9 is a cross sectional view of a collar member for the modified coupling apparatus.

FIG. 10 is a cross sectional view of the modified coupling apparatus with the collar member removed.

DESCRIPTION OF THE PREFERRED EMBODIMENT

Figure 1:
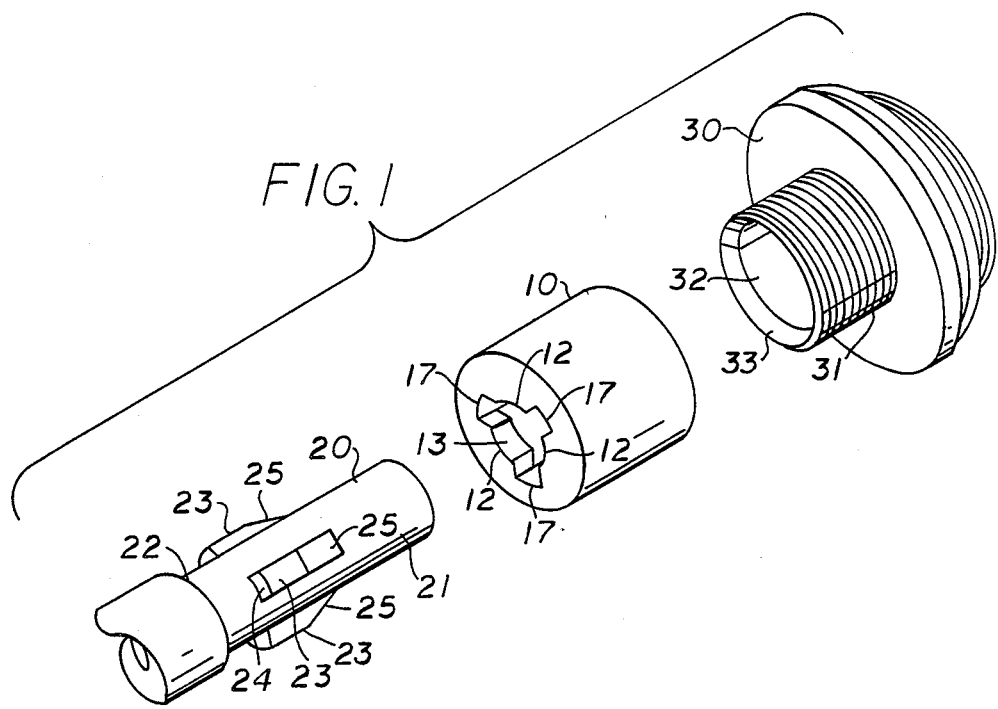
FIG. 1 is an exploded isometric view of the collar, shaft, and threaded members of the coupling apparatus in accordance with the present invention.

Referring to the drawings by numerals of reference, there is shown in FIG. 1, an internally threaded collar 10, a lugged shaft 20, and a cylindrical threaded member 30 having external threads 31 and central bore 32 chamfered 33 at the forward end. For purposes of illustration, the threaded member shown is a firearm silencer mount but may be any other type of cylindrical threaded member.

Figure 2:
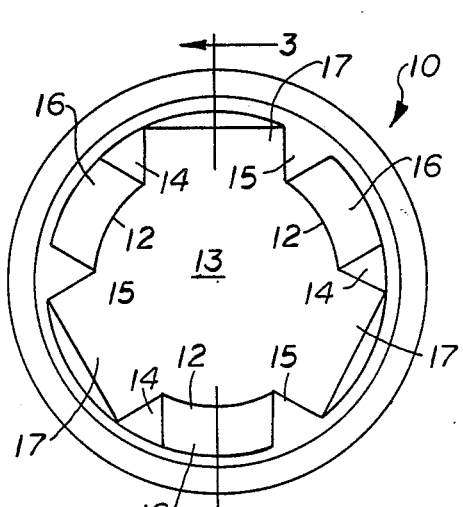
FIG. 2 is an end view of the collar member.
Figure 3:
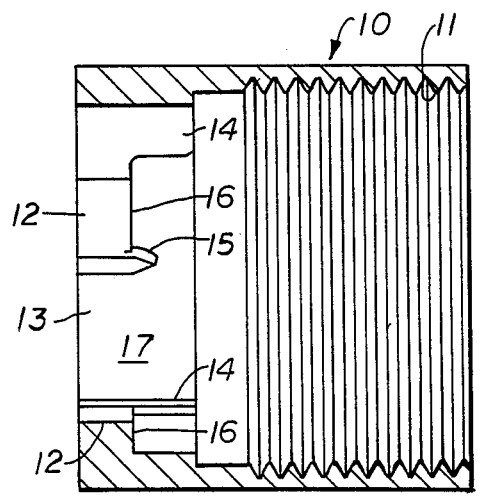
FIG. 3 is cross section view of the collar member taken along the line 3—3 of FIG. 2.

As best seen in FIGS. 2 and 3, the collar 10 has an internally threaded portion 11 extending inwardly from one end and a series of circumferentially spaced internal lugs 12 at the opposite end which extend radially inward to form a central opening 13. The lugs 12 have a long longitudinal raised side 14 and a short longitudinal raised side 15 which define inwardly facing recesses or pockets 16 therebetween. The lugs 12 form circumferentially spaced openings or apertures 17 therebetween.

Figure 4:
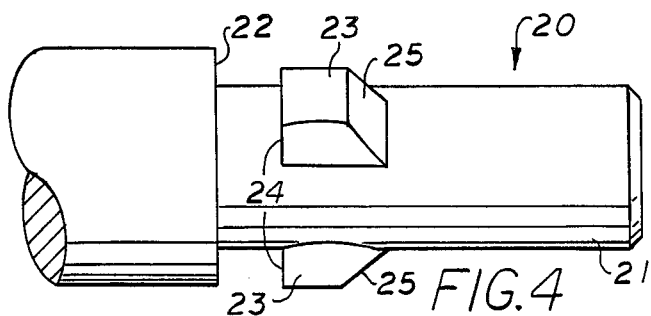
FIG. 4 is a side elevation of the shaft member.
Figure 5:
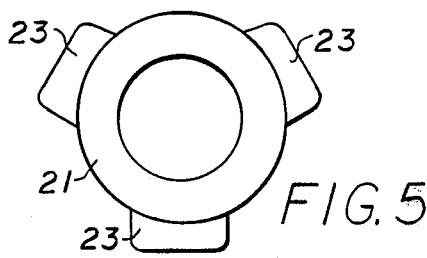
FIG. 5 is an end view of the shaft member.

As best seen in FIGS. 4 and 5, one end of the cylindrical shaft 20 has a reduced diameter portion 21 defining a circumferential raised shoulder 22 and a series of circumferentially spaced external lugs 23 extend radially outward from the reduced diameter portion 21 a distance from the shoulder 22. The external lugs 23 of shaft 20 are configured to be slidably received through the apertures 17 and engage the pockets 16 of the internal lugs 12 of the collar 10 with side clearance between the long sides 14 and the short sides 15.

The back end 24 of each lug 23 (facing the shoulder 22) is perpendicular to the longitudinal axis of the shaft 20 and the front end 25 of each lug is tapered inwardly to correspond to the angle of the chamfer 33 of the threaded member 30. The back ends 25 of the lugs 23 nest in the pockets 16 of the collar lugs 12. The shoulder 22 prevents the collar 10 from sliding too far over the shaft 20 and urges the collar lugs 12 to engage with the shaft lugs 23 for locking and unlocking. The shaft lugs 23 pass over the short sides 15 of the collar lugs 12, and the long sides 14 prevent relative rotation between the collar 10 and shaft 20 as explained hereinafter.

A modification of the collar coupling is shown in FIGS. 7-10. To avoid repetition, the previously described features of the shaft and collar will be assigned the numerals of reference, but their description will not be repeated. A modified threaded member 40 (FIG. 10) is provided with a hexagonal recess or pocket 41 which surrounds the external threaded portion 42. A cylindrical locking ring 50 (FIG. 7 and 8) is provided which has a hexagonal portion 51 at one end, a short cylindrical portion 52 at the other end, a circumferential flange 53 therebetween, and a central bore 54. The end surface of the cylindrical portion 52 has radial teeth or serrations 55. The locking ring 50 is slidably received over the external threads 42 of the threaded member 40 and the hexagonal portion 51 is slidably received in the pocket 41. A circular spring or Bellville washer 56 is installed between the locking ring shoulder 53 and the threaded member 40 to urge the locking ring away from the threaded member.

A modified collar 60 having the same lug features as previously described is provided with radial teeth or serrations 61 which correspondingly engage the serrations 55 of the locking ring 50 in a ratchet action to prevent the collar 60 from becoming loosened or unscrewing off the threaded member 40. Pushing on the shoulder 50 depresses the spring 56 and allows the serrations 55 and 61 to disengage and the collar 60 to be unscrewed.

Figure 11:
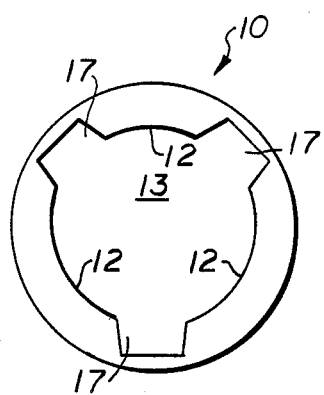
FIG. 11 is an end view of a modified collar member having circumferentially unequally spaced apart internal lugs.
Figure 12:
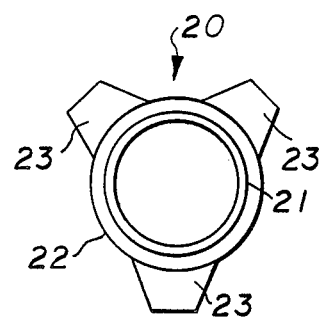
FIG. 12 is an end view of a modified shaft member having circumferentially unequally spaced apart external lugs.

As shown in and view in FIGS. 11 and 12, a further modification of the coupling apparatus is accomplished by providing the collar internal lugs 12 and the shaft external lugs 23 with unequal circumferential spacing whereby a predetermined set position of the shaft 20 relative to the threaded member may be achieved to obtain accurate indexed alignment of the coupled members.

OPERATION

Referring again to FIGS. 1 and 6, the collar 10 is screwed onto the external threads 31 of threaded member 30 and is from two to three threads from being tight (bottomed out). In the following description it is assumed that the components are provided with right hand threads, however it should be understood that the components may be configured for use in left hand thread applications.

The reduced diameter 21 of shaft 20 is inserted through the central opening 13 of collar 10 and into bore 32 of threaded member 30 in such a manner as to cause lugs 23 to pass through corresponding apertures 17 of collar 10 until the shoulder 22 stops against the outer surface of collar 10 and the shaft 20 will go no further. With a right hand twisting motion to threaded member 30 causing the collar 10 to turn with it and shaft lugs 23 to pass over the short sides 15 of the collar lugs 12, until they stop against the long sides 14 of the lugs 12 at which time the collar 10 can rotate no more causing it to be drawn in the direction of the rotating threaded member 30 until shaft lugs 23 are firmly nested in pockets 16 of the collar lugs 12.

To disassemble the coupling, a reverse axial rotation is applied to threaded member 30 causing shaft lugs 23 to stop against the short sides 15 of the collar lugs 12 until two or three rotations have been made, at which time, with rearward pressure on threaded member 30, the shaft lugs 23 are stopped against the long sides 14 of the collar lugs 12 at which time the shaft lugs 23 will be in alignment with the clearance apertures 17 in the collar 10 and the collar and the threaded member 30 can then be removed as a unit by simply pulling them off the shaft 20 in a linear motion without further unscrewing or disassembly.

It should be noted that in actual use, the collar 10 does not need to be completely removed from the threaded member 30 to effect mating with the shaft 20. In other words, the collar 10 need only be backed off the threaded member 30 a sufficient distance to allow rotation of the shaft lugs 23 and the shaft can be removed or inserted.

In the modified version, the spring loaded engagement of the serrations 55 and 61 allows only right hand rotation (tightening) of the collar. To rotate the collar in the reverse direction (loosen), the shoulder 53 of the locking ring 50 must be depressed to release engagement of the serrations.

While this invention has been described fully and completely with special emphasis upon several preferred embodiments, it should be understood that within the scope of the appended claims the invention may be practiced otherwise than as specifically described herein.

I claim:

1. Coupling apparatus for securing a shaft to an externally threaded member comprising:
   a cylindrical collar member having internal threads at one end to be threadedly received on the threaded member and at its other end a series of circumferentially spaced internal lugs extending radially inward to define a central opening and a series of circumferential apertures between the internal lugs,
   each said collar internal lug having a long longitudinal raised side and a short longitudinal raised side which define inwardly facing recesses therebetween, and
   a cylindrical shaft member having a plurality of circumferentially spaced external lugs at one end extending radially outward from the shaft,
   said shaft member having a diameter sufficient to be slidably received through the central opening of said collar member and said external lugs configured to be slidably received through the apertures of said collar member and pass over the short side and engage the long side of said collar internal lugs upon relative rotation between said collar and said shaft members, whereby
   when said collar member is threaded onto said threaded member in one direction said shaft external lugs will become seated in the recesses of said collar internal lugs and said shaft will be drawn into firm engagement on the threaded member to securely connect said shaft member to the threaded member, and
   when said collar member is rotated in the opposite direction relative to the threaded member said shaft external lugs will become unseated from said recesses and pass over the short sides of said collar internal lugs allowing said shaft to be removed from said threaded member and said collar.

2. Coupling apparatus according to claim 1 in which the threaded member has a central bore at the externally threaded end, and
   said shaft has a diameter extending beyond said external lugs to be slidably received in the threaded member central bore to accurately align said shaft with the threaded member.

3. Coupling apparatus according to claim 2 in which the central bore of the threaded member is chamfered at the externally threaded end, and
   said shaft external lugs have a tapered surface corresponding to the angle of the chamfer to become engaged thereon when said shaft is drawn into firm engagement on the threaded member.

4. Coupling apparatus according to claim 2 in which
said shaft has a circumferential raised shoulder spaced longitudinally from said external lugs to prevent excessive longitudinal movement of said collar relative to said shaft.

5. Coupling apparatus according to claim 1 including;
a generally cylindrical locking ring member having a central bore slidably received on the threaded portion of the threaded member and removably engaged thereon in a non-rotating relation,
said locking ring having a radially toothed end surface surrounding the threaded portion and facing in the same direction,
spring means between the threaded member and said locking ring to urge said locking ring axially outward therefrom, and
said collar member has a radially toothed end surface surrounding the internally threaded end and facing in opposed relation to the toothed surface of said locking ring, whereby
when said collar is threaded onto said threaded member in one direction said opposed toothed surfaces will become engaged and rotatably ratchet as said collar is rotated relative to said locking ring and said shaft is drawn into firm engagement on the threaded member to securely connect said shaft to the threaded member, and
when said collar is rotated in the opposite direction relative to said locking ring said opposed toothed surfaces will become engaged to prevent relative rotation between said locking ring and said collar to prevent accidental unthreading or loosening of the connection.

6. Coupling apparatus according to claim 5 in which
said locking ring and said collar member opposed toothed surface are disengaged by pressing said locking ring toward the threaded member to depress said spring means allowing rotational movement of said collar member relative to said locking ring in either direction.

7. Coupling apparatus according to claim 6 in which
said cylindrical locking ring has a hexagonal portion at one end slidably received in a hexagonal recess on the threaded member to prevent relative rotation therebetween, and
a short cylindrical portion at the other end defining a circumferential flange therebetween.

8. Coupling apparatus according to claim 5 in which said spring means comprises a Belville washer.

9. Coupling apparatus according to claim 1 in which said collar internal lugs and said shaft external lugs are circumferentially equally spaced apart.

10. Coupling apparatus according to claim 1 in which
said collar internal lugs and said shaft external lugs are circumferentially unequally spaced apart, whereby
a predetermined set position of the shaft relative to the threaded member may be achieved to obtain accurate indexed alignment of the coupled members.

* * * * *